Figure 1:
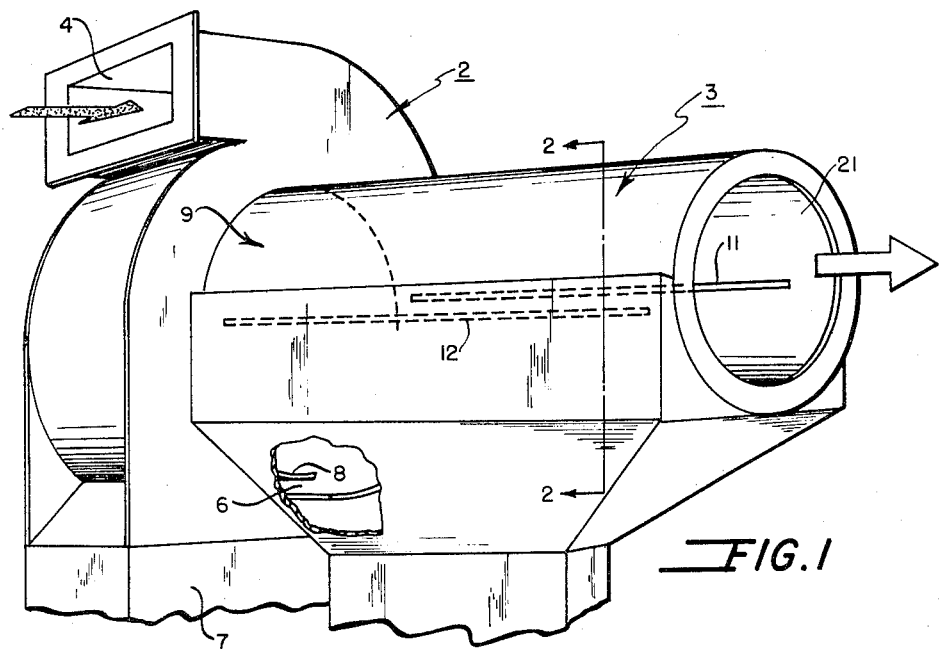

March 1, 1966 A. NUTTING 3,237,385
DUST COLLECTOR ARRANGEMENT
Filed July 9, 1962

INVENTOR.
ARTHUR NUTTING
BY
*Ralph B. Greek*
ATTORNEY

United States Patent Office 3,237,385
Patented Mar. 1, 1966

3,237,385
DUST COLLECTOR ARRANGEMENT
Arthur Nutting, Louisville, Ky., assignor to American Air Filter Company, Inc., Louisville, Ky., a corporation of Delaware
Filed July 9, 1962, Ser. No. 208,325
3 Claims. (Cl. 55—235)

The present invention relates to dust collecting apparatus and more particularly to dust collecting apparatus arranged to selectively remove contaminant particles from a dirty gas stream.

In accordance with the present invention, a novel dust collector arrangement is provided wherein dry and wet dust separating operations are combined in a straightforward, efficient assembly which can be operated continuously without liquid storage and without concomitant problems of rusting and freezing. Further, the present invention provides a dust collector arrangement which can operate with minimum liquid requirements and still provide maximum gas-liquid contact surface. In addition, the present invention provides a dust collector arrangement which can be easily inspected and easily cleaned, such arrangement finding particular utility in any one of a number of process reclaiming operations in industries such as chemical processing and steel manufacturing.

Various other features of the present invention will become obvious to one skilled in the art upon reading the disclosure set forth herein.

More particularly the present invention provides apparatus for selectively removing contaminant particles from a dirty gas stream comprising a first generally cylindrical dry separating chamber including spaced dirty gas inlet means and clean gas outlet means and further including a contaminant outlet means disposed along the curved wall of the chamber; the gas inlet means of the first cylindrical chamber being tangentially positioned relative the chamber whereby a dirty gas stream introduced into the chamber moves in a centrifugal path therealong so that larger contaminant particles in the gas stream are carried off through the contaminant outlet means; the gas outlet means of the first chamber being positioned along the longitudinal axis of the chamber and being so dimensioned that the gas stream continues its movement in a centrifugal path as it passes therethrough; a second generally cylindrical separating chamber including spaced dirty gas inlet means and clean gas outlet means positioned along the longitudinal axis thereof and further including a contaminant outlet means disposed intermediate the spaced gas inlet and gas outlet means in the second chamber; the second chamber being axially aligned with the first chamber with the gas inlet means of the second chamber communicating with the gas outlet means of the first chamber in such a manner that the gas stream continues its movement in a centrifugal path as it passes from one chamber to the other; and, a liquid supply means arranged to form a liquid wetting surface along a portion of the second chamber to entrain smaller contaminant particles in the gas stream therein so that they are carried off with the liquid through the contaminant outlet of the second chamber.

It is to be understood that various changes can be made by one skilled in the art in the arrangement, form and construction of the apparatus disclosed herein without departing from the scope or spirit of the present invention.

Figure 2:
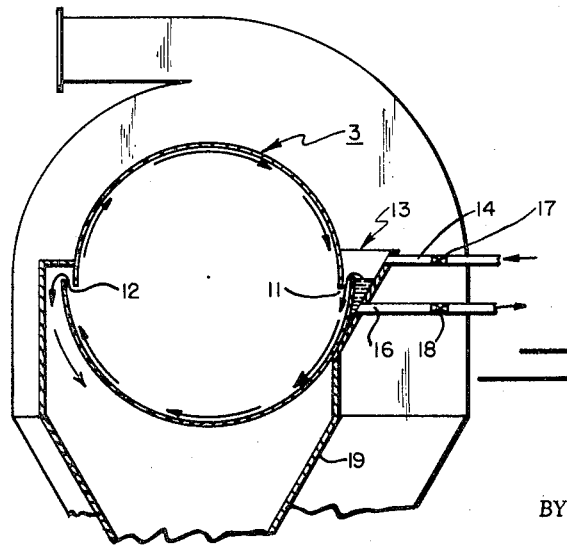

Referring to the drawing:
FIGURE 1 is an isometric, partially broken-away view of a dust collector arrangement incorporating the features of the present invention; and
FIGURE 2 is a cross-sectional, elevational view taken in a plane passing through line 2—2 of FIGURE 1.

As can be seen in FIGURE 1 of the drawing, the apparatus of the present invention includes two axially aligned, generally cylindrical chambers 2 and 3, each of which is comprised of a generally cylindrical curved side wall member interposed between spaced, flat end wall members. Chamber 2 is provided with dirty gas inlet passage 4 which is positioned tangentially relative the curved side wall of the chamber. As a result, a dirty gas stream entering chamber 2 is subjected to centrifugal forces which compel larger contaminant particles in the gas stream to follow the curved wall of the chamber so as to be passed off through peripheral slot 6 in such curved wall and into hopper 7 positioned below chamber 2. As will be noted, concentrator baffle 8 can be provided within chamber 2 adjacent the peripheral wall thereof to concentrate the larger contaminant particles along such wall for disposal through slot 6.

Positioned along the longitudinal axis of chamber 2 in one of the end walls thereof is passage 9. Passage 9 serves to communicably connect aligned chambers 2 and 3, providing a gas outlet for chamber 2 and a gas inlet for chamber 3. It is to be noted that passage 9 is so dimensioned that a gas stream which has been centrifuged in chamber 2 exists through the passage in whirling fashion to be subjected to centrifugal forces within generally cylindrical chamber 3. It also is to be noted in the drawing (FIGURE 2), that generally cylindrical chamber 3 is so arranged that the upper portion of the curved wall thereof is of slightly lesser diameter than the lower portion of such curved wall to thereby provide longitudinally extending, spaced parallel upstream and downstream slots 11 and 12 respectively. Advantageously, these slots should be of sufficient breadth to avoid what is known as "wet-dry" areas where contaminant particles would tend to collect and seal off slot passages.

Fixed along the outer wall of chamber 3 to extend longitudinally adjacent upstream slot 11 is weir trough 13. Trough 13 is so arranged that it can be provided with controlled volumes of wetting liquid, such as water, through a suitable liquid control system which can include liquid supply line 14 connected at one end to the upper portion of trough 13 and connected at its other end to a source of liquid supply (not shown) and liquid take-off or drain line 16 connected at one end to the lower portion of trough 13 and at its other end to a return system (not shown). Suitable hand operated control valves 17 and 18 can be provided in the supply and take-off lines 14 and 16 respectively, these valves being so adjusted that a thin layer of liquid is fed continuously from trough 13 through upstream inlet slot 11 to the lower surface of the curved wall of chamber 3. As the centrifuging gas stream enters chamber 3, it comes into contact with this layer of liquid and smaller contaminant particles are entrained therein to be carried off with the liquid through downstream slot 12 into collecting hopper 19 positioned below chamber 3. The gas stream, freed of larger contaminant particles by dry separator chamber 2 and smaller contaminant particles by wet separator chamber 3, then is passed off through clean gas outlet 21 positioned in axially spaced alignment with passage 9 in the opposite end wall of chamber 3. It is to be noted that outlet 21 is dimensioned to permit ready passage of a clean gas stream therethrough and is arranged to provide easy inspection of and ready access to chamber 3.

The invention claimed is:
1. Apparatus for selectively removing contaminant particles from a dirty gas stream comprising:
(a) a first generally cylindrical dry substantially unobstructed separating chamber including dirty gas inlet means and clean gas outlet means spaced from said dirty gas inlet means and further including a contaminant outlet means disposed along the curved wall of said chamber;

(b) said gas inlet means of said first cylindrical chamber being tangentially positioned relative said curved wall of said chamber whereby a dirty gas stream introduced into said chamber moves in a centrifugal path therealong so that larger contaminant particles in said gas stream are carried off through said contaminant outlet;

(c) said gas outlet means of said first dry chamber being positioned along the longitudinal axis of said first cylindrical chamber and being of sufficient area relative the cross-sectional area of said first chamber transverse said longitudinal axis that the gas stream continues its movement in a centrifugal path as it passes there through;

(d) a second generally cylindrical wet substantially unobstructed separating chamber including spaced dirty gas inlet means and clean gas outlet means positioned along the longitudinal axis thereof and further including a longitudinally extending contaminant outlet means disposed intermediate said spaced gas inlet and gas outlet means of said second chamber;

(e) said second chamber being substantially axially aligned with said first chamber in side-by-side relationship therewith with said gas inlet means of said second chamber communicating with said gas outlet means of said first chamber in such a manner that the gas stream continues movement in a substantially continuous centrifugal path in said second chamber; and, (f) longitudinally extending slot-like liquid supply means disposed along the periphery of said second chamber and arranged to form a longitudinally extending thin sheet-like liquid film in concurrent flow with the gas stream along a portion of the inner surface of said second chamber to entrain the smaller contaminant particles in said gas stream therein so that they are carried off with the liquid through said contaminant outlet of said second chamber.

2. Apparatus for selectively removing contaminant particles from a dirty gas stream comprising:

(a) a first generally cylindrical dry substantially unobstructed chamber including dirty gas inlet means and clean gas outlet means spaced from said dirty gas inlet means and further including a contaminant outlet slot disposed in the curved wall of said chamber to extend along the length thereof;

(b) said gas inlet means of said first cylindrical chamber being tangentially positioned relative said curved wall of said chamber whereby a dirty gas stream introduced into said chamber moves in a centrifugal path therealong so that larger contaminant particles in said gas stream are carried off through said contaminant outlet slot;

(c) said gas outlet means of said first dry chamber being positioned along the longitudinal axis of said first cylindrical chamber and being of sufficient area relative the cross-sectional area of said first chamber transverse said longitudinal axis that the gas stream continues its movement in a centrifugal path as it passes therethrough;

(d) a second generally cylindrical wet substantially unobstructed separating chamber including dirty gas inlet means and clean gas outlet means positioned along the longitudinal axis thereof in spaced relationship from said dirty gas inlet means and further including substantially parallel and spaced longitudinally extending liquid inlet and contaminant outlet slots disposed in the curved wall of said second chamber intermediate said spaced gas inlet and gas outlet means of said chamber;

(e) said second chamber being substantially axially aligned with said first chamber in side-by-side relationship therewith with said gas inlet means of said second chamber communicating with said gas outlet means of said first chamber in such a manner that the gas stream continues movement in a substantially continuous centrifugal path in said second chamber; and, (f) longitudinally extending slot-like liquid supply means disposed along the periphery of said second chamber and cooperating with said liquid inlet slot to deliver liquid therethrough to form a thin sheet-like wetting surface in concurrent flow with the gas stream in said second chamber between said spaced liquid inlet and contaminant outlet slots to entrain the smaller contaminant particles in said gas stream therein so that they are carried off with the liquid through said contaminant outlet slot.

3. The apparatus of claim 2, said liquid supply means comprising a weir-like trough positioned along the outside wall of said second chamber to extend adjacent to and along the length of said liquid inlet slot, said trough having control means to permit said trough to deliver liquid in thin sheet-like form through said slot into said chamber.

References Cited by the Examiner

UNITED STATES PATENTS

| | | | |
|---|---|---|---|
| 567,988 | 9/1896 | Lynch et al. | 55—250 XR |
| 1,132,677 | 3/1915 | Murray et al. | 261—112 XR |
| 1,866,196 | 7/1932 | Criqui et al. | 55—235 X |
| 2,259,034 | 10/1941 | Fisher. | |
| 3,031,825 | 5/1962 | De La Fourniere | 55—236 |

FOREIGN PATENTS

| | | |
|---|---|---|
| 472,729 | 9/1937 | Great Britain. |

HARRY B. THORNTON, *Primary Examiner.*

ROBERT F. BURNETT, *Examiner.*